United States Patent
Beehler et al.

(10) Patent No.: US 7,332,998 B2
(45) Date of Patent: Feb. 19, 2008

(54) SYSTEM AND METHOD FOR CONTROLLING A VEHICLE SECURITY SYSTEM

(75) Inventors: Ryan Beehler, Garden City, MI (US); Joseph Dentamaro, St. Clair Shores, MI (US); Ryan Edwards, Macomb Township, MI (US); Michael Schroeder, Harrison Township, MI (US); David Showalter, Royal Oak, MI (US); Peter Stouffer, Holly, MI (US); Shane Wilson, Clinton Township, MI (US)

(73) Assignee: Audiovox Corporation, Hauppauge, NY (US)

( * ) Notice: Subject to any disclaimer, the term of this patent is extended or adjusted under 35 U.S.C. 154(b) by 439 days.

(21) Appl. No.: 10/691,918

(22) Filed: Oct. 23, 2003
(Under 37 CFR 1.47)

(65) Prior Publication Data

US 2005/0088280 A1    Apr. 28, 2005

(51) Int. Cl.
*H04Q 9/00* (2006.01)

(52) U.S. Cl. .................. 340/5.63; 340/5.73; 340/5.72; 340/5.54

(58) Field of Classification Search ............... 340/5.63, 340/825.31, 825.69, 825.72, 5.73, 5.72, 5.54
See application file for complete search history.

(56) References Cited

U.S. PATENT DOCUMENTS

| | | | |
|---|---|---|---|
| 4,754,255 A * | 6/1988 | Sanders et al. ............. 307/10.4 |
| 5,285,186 A | 2/1994 | Chen ......................... 340/428 |
| 5,479,156 A | 12/1995 | Jones ..................... 340/825.31 |
| 5,537,474 A | 7/1996 | Brown et al. ................. 380/23 |
| 5,602,535 A | 2/1997 | Boyles et al. .......... 340/825.31 |
| 5,635,693 A | 6/1997 | Benson et al. .............. 235/384 |
| 5,635,769 A | 6/1997 | Caren et al. ............... 307/10.2 |
| 5,668,875 A | 9/1997 | Brown et al. ................. 380/23 |
| 5,815,557 A * | 9/1998 | Larson ...................... 340/5.73 |
| 6,192,474 B1 | 2/2001 | Patel et al. ................. 713/171 |
| 6,870,458 B2 * | 3/2005 | Caren ........................ 340/5.22 |
| 6,975,202 B1 * | 12/2005 | Rodriguez et al. ..... 340/825.69 |
| 7,046,161 B2 * | 5/2006 | Hayes ................... 340/825.69 |
| 7,114,178 B2 * | 9/2006 | Dent et al. ..................... 726/6 |
| 2003/0020601 A1 | 1/2003 | Caren |
| 2003/0141987 A1 | 7/2003 | Hayes |
| 2003/0179076 A1* | 9/2003 | Underdahl ................. 340/5.72 |
| 2005/0040933 A1* | 2/2005 | Huntzicker ................ 340/5.72 |

\* cited by examiner

*Primary Examiner*—Jeffery Hofsass
*Assistant Examiner*—Scott Au
(74) *Attorney, Agent, or Firm*—F. Chau & Associates, LLC (57) ABSTRACT

A method for selectively controlling a security system comprises receiving a tag identification, determining a security identification based on the tag identification, and transmitting a message comprising the security identification and a security system command. A security system having a unique security identification comprises a control device for controlling the security system, wherein the control device transmits a message to the security system comprising the unique security identification and a function command, the control device comprising keypad for entering a tag identification corresponding to the unique security identification.

28 Claims, 7 Drawing Sheets

SYSTEM AND METHOD FOR CONTROLLING A VEHICLE SECURITY SYSTEM

BACKGROUND OF THE INVENTION

1. Field of the Invention

The present invention relates to remote vehicle control, and more particularly to a system and method for selectively controlling one or more vehicle security systems.

2. Discussion of Related Art

Car dealerships typically have tens or hundreds of cars in inventory at any given time. Protecting the inventory typically involves installing a security system in each vehicle.

Vehicles that include a security system prior to a consumer sale are called pre-load vehicles. The pre-load lot security systems typically use a set of transmitters or control devices having a shared controller identification. The security systems are assigned a shared Security Identification Code (SIC), wherein any of the control devices can be used to control any of the security systems. The transmission range of the control devices is reduced so that only vehicles in a close proximity, e.g., within 5 feet, are responsive. However, even with a reduced range, a control device can operate more than one vehicle within the reduced range. Further, the reduced range does not guarantee that if a security system is unintentionally disarmed that it will later be armed by the control device.

Typically, for lot security systems, every vehicle on the lot is programmed with the same SIC. This enables multiple users, each using a RF control device, to access all the pre-load vehicles on the lot. Access to multiple vehicles simultaneously is partially controlled by limiting the broadcast range of the RF control device. Thus, only a small number of vehicles respond when a command is sent from the RF control device.

The existence of the control device is a vulnerability of the lot security systems, wherein a thief having obtained the control device can control each vehicle in the dealer inventory.

Therefore, a need exists for a system and method for selectively controlling one or more security system.

SUMMARY OF THE INVENTION

According to an embodiment of the present invention, a security system having a unique security identification comprises a control device for controlling the security system, wherein the control device transmits a message to the security system comprising the unique security identification and a function command, the control device comprising means for entering a tag identification corresponding to the unique security identification.

The control device is a wireless control device. The means for entering the tag identification is a keypad.

The security system further comprises an authentication control module for granting an operational parameter of the control device. The security system further comprises a database including the operational parameter, wherein the database is accessible by the authentication control module.

The control device comprises a serial number known to a database including the operational parameter, wherein the database is accessible by the authentication control module.

The security system further comprises further comprising an interface of the authentication control module. The interface is a computer software product stored in a computer coupled to the authentication control module.

The tag identification is mixed with a base identification to determine the unique security identification.

According to an embodiment of the present invention, a method for selectively controlling a security system comprises receiving a tag identification, determining a security identification based on the tag identification, and transmitting a message comprising the security identification and a security system command.

The method comprises comparing the security identification to a stored security identification in the security system. The method comprises executing the security system command upon determining the security identification to correspond to a stored security identification in the security system.

The security identification is unique to the security system. The security system command controls one or more of a lock feature, an unlock feature, a find feature, a panic feature, an arm feature, a disarm feature, a light feature, a start feature, and a trunk feature.

The method comprises broadcasting the message to control at least two security systems.

The method comprises defining functions of the security system in a control device.

The method further comprises changing a mode of the security system, wherein changing the mode is permanently defined by a global control device. A permission for changing the mode is granted by an authentication control module.

The method comprises defining, permanently, a base identification of a management system in a control device. The method comprises defining a permission for transmitting the security system command according to an authentication control module message.

The method further comprises defining a base identification of a control device according to an authentication control module message. The base identification expires after a pre-determined time interval. The base identification expires after a time interval that is selectable in an authentication control module.

A control device has a unique identification.

An authentication control module selectively allows or denies a control device's access to a base identification. An authentication control module selectively sets an expiry time for a base identification. An authentication control module sets a permission for the security system function. An authentication control module selectively sets a permission changing a mode of the security system.

The method comprises communicating wirelessly, two-way, between an authentication control module and a control device. The method comprises communicating, two-way, between an authentication control module and a control device via a docking station.

The method further comprises changing a mode of the security system wirelessly. A dealer mode provides a passive arming function and a test drive function. A consumer mode provides at least one of a remote security function, a keyless entry function, a security upgrade to keyless entry function, a remote car start function, and a remote car start upgrade to keyless entry function.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a system and method comprise a set of functions for controlling electronic vehicle security systems. A control device is used for controlling individual vehicle security systems, wherein the control device comprises a means for selecting a vehicle security system to be controlled. Each vehicle security system has a unique Security Identification Code (SIC).

It should be noted the vehicle security system comprises one or more features for operating components of a vehicle. For example, the vehicle security system may comprise features for operating door locks, windows, remote start features, and anti-theft features. One of ordinary skill in the art would recognize that this is not an exhaustive list of contemplated features, and that other features can by implemented.

Security systems can be installed at, for example, the car dealer level or by original equipment manufacturers. A vehicle security system is installed on each vehicle in the dealer's inventory. The vehicle security systems help to deter theft and are a form of self-insurance for the dealer. Further, the control system and method can assist the dealer in managing inventory. Because the security systems are installed at a pre-load level, there is a greater incentive for the dealer to sell the vehicle security systems.

Dealer tools, e.g., an authentication control module, a control device, and a database, interface with the vehicle security systems. This allows for the protection of the vehicles through individualized access to the vehicles with the control device or access tool.

The control device is adapted for a transmission range of, for example, several hundred feet, wherein only the selected vehicle security system will respond. A user selects a vehicle security system according to a tag identification. The tag identification corresponds to a vehicle in which the security system is installed, or may correspond the security system directly. Upon entering the tag identification in the control device, a corresponding vehicle security system can be operated. The control device comprises a keypad for entering the tag identification. Other means can be used to enter the vehicle security system tag identification, such as by voice command, scroll menu, handwriting recognition, radio-frequency identification transponder pickup in conjunction with an electronic pellet stored in a vehicle ignition key.

According to an embodiment of the present invention, the system allows a user to command a selected vehicle security system. Accordingly, a control device can transmit commands over a wide range, e.g., about several hundred feet, without regard to the other vehicle security systems within the range. Given the range capabilities of the control device, the user can locate a particular vehicle in lot by commanding the particular vehicle security system to sound a horn and/or flash lights. According to an embodiment of the present invention, a remote start function can be used to keep batteries charged in selected vehicles. Further, since access is granted to a single vehicle at a time, the user can set functions or features of the selected security system with confidence that no other vehicles are affected.

According to an embodiment of the present invention, each control device is serialized and can be removed from the system if it becomes lost or stolen.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
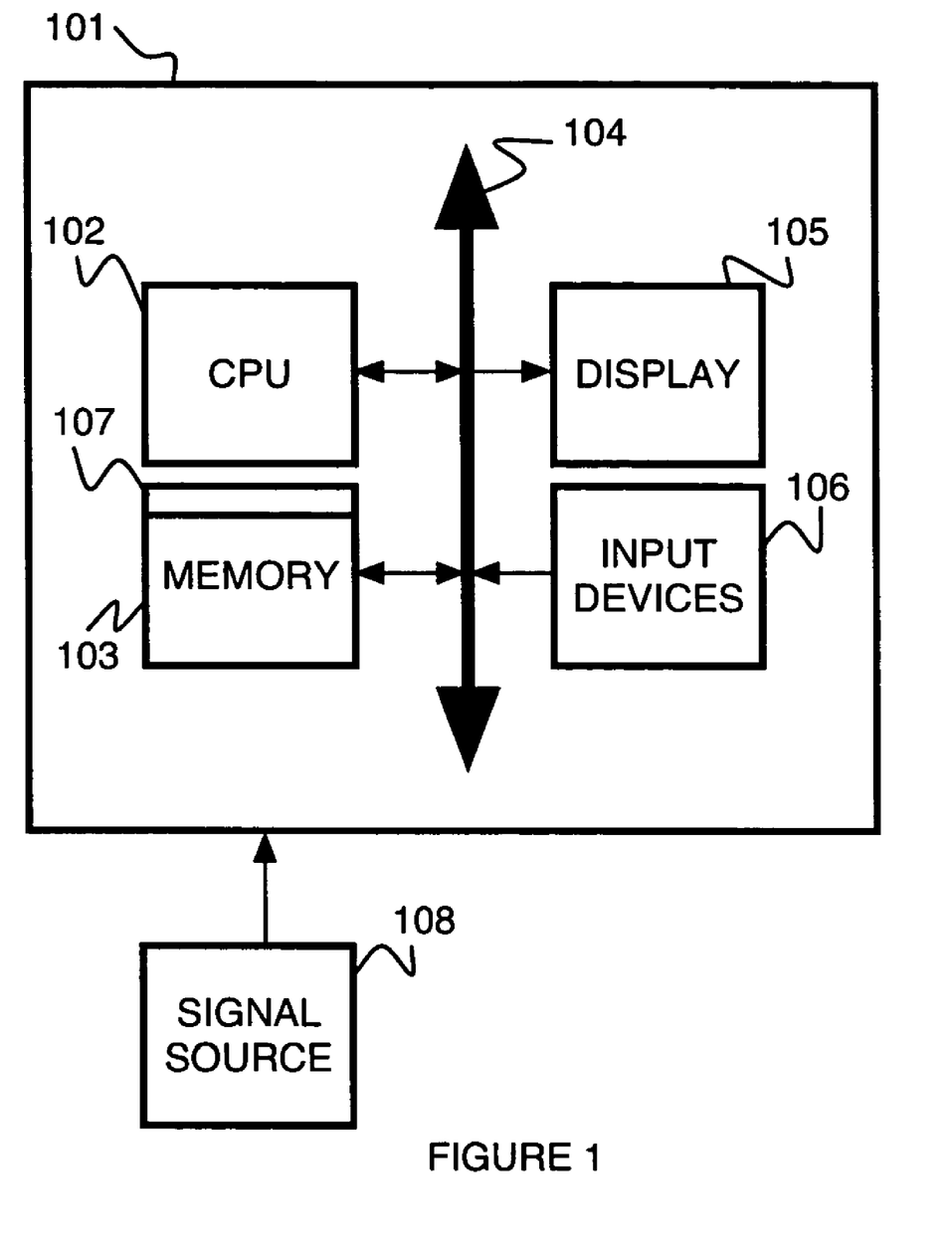
FIG. 1 is a diagram of a system according to an embodiment of the present invention.

Referring to FIG. 1, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, multiple vehicles can be protected using individual security systems and one or more handheld control devices. These control devices are issued to dealership personnel. The control devices work in conjunction with the vehicle security systems and a device for enabling and disabling the control devices based on a parameter, such as a control device controller identification, time of day, or day of week. The device for enabling and disabling the control devices is an Authentication Control Module (ACM).

Figure 2A:
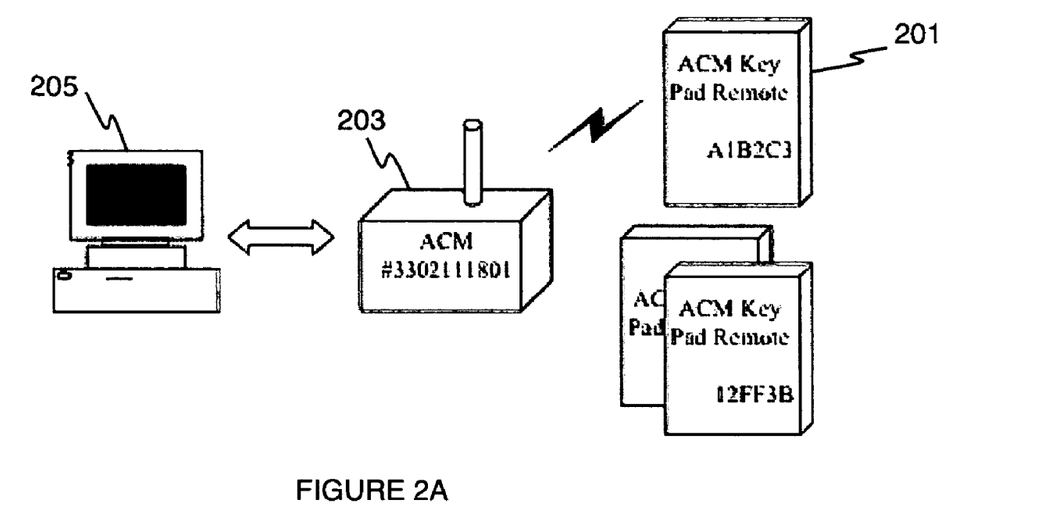
FIG. 2a is a diagram of a system according to an embodiment of the present invention.
Figure 2B:
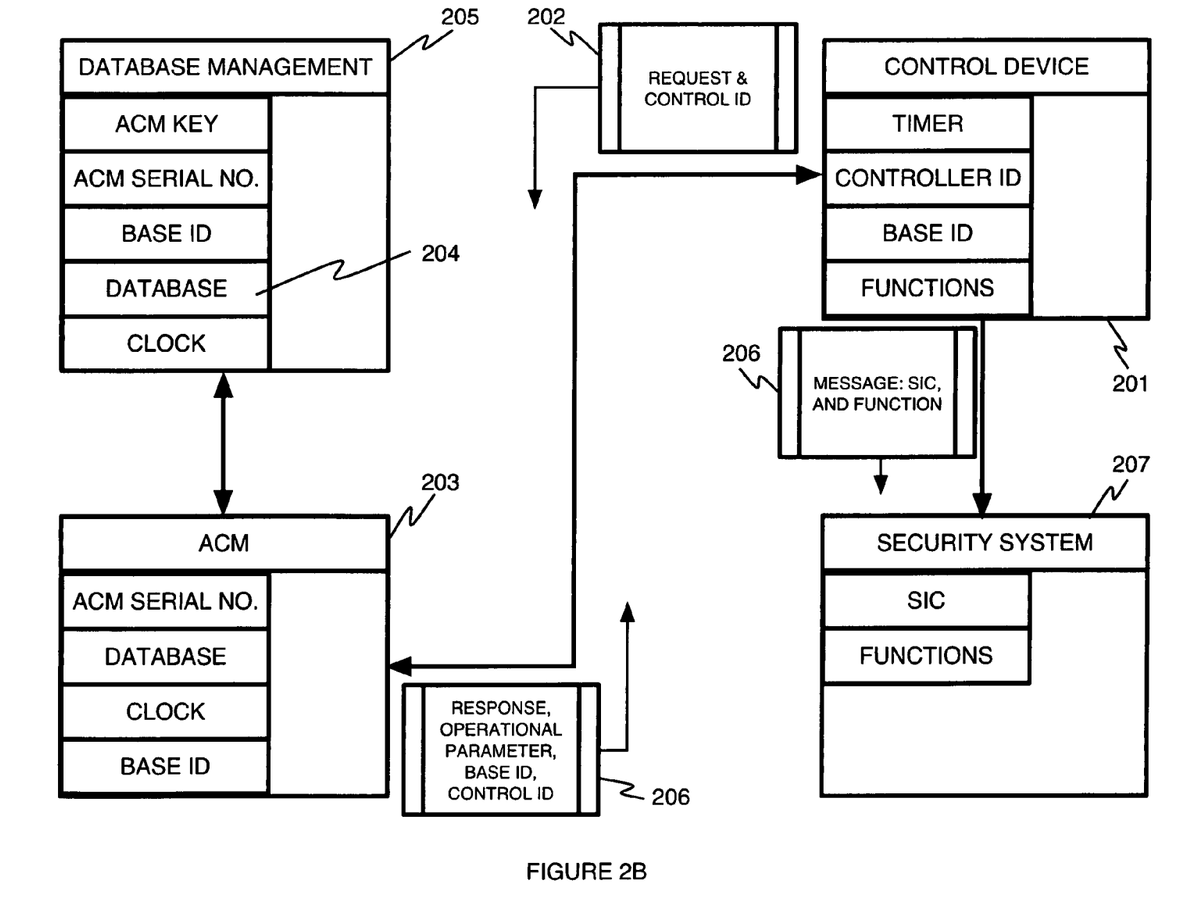
FIG. 2b is a diagram of a system according to an embodiment of the present invention.

Referring to FIGS. 2a and 2b, a control device 201 sends a message 202 to the ACM 203 to request permission to operate. The message 202 comprises an authentication request and a controller identification code corresponding to the control device. The ACM 203 grants or denies permission to operate based on information within a database 204 of a database management system 205. The database 204 can be stored in, for example, a personal computer or uploaded to the ACM 203. The ACM 203 sends a reply according to the information in the database 204 via a reply message 206 to the control device 201, the message 206 providing authentication in a case where the control device is granted permission to operate. The reply message 206 comprises a response specifying operational parameters and a based identification of the database. The operational parameters define, for example, daily operational windows and an expiration date/time for the authentication. The reply message 206 can further comprise the controller identification. An authenticated control device can then be used to control any vehicle on the dealer lot via a control message 206 comprising an appropriate SIC and function command providing that the vehicle has been fitted with a compatible security system 507.

As shown in FIG. 2B, the database management system 205 and the ACM 203 comprise clocks. These clocks are real-time clocks. The clocks of the database management system 205 and the ACM 203 are synchronized. Further, each control device comprises a timer means. The timer means can be a real-time clock or a timer. The time can be used for monitoring operational parameters, such as the expiry of a time during which operational parameters are granted.

The ACM 203 can be accessed by other systems, for example, a video display and data entry device can be connected to the ACM, wherein the database is stored in the ACM. An example of the video display and data entry device is a personal digital assistant (PDA). It is to be understood that other methods for accessing the ACM are contemplated and would be obvious to one of ordinary skill in the art in light of the present disclosure, for example, the ACM can be accessed through a network connection and web browser.

Communication between the ACM and the control device is by radio frequency (RF) signals. The communication is two-way. It should be noted that communication can be by other means, such as infrared (IR) signals, wired connections, or interface to original-equipment installed or dealer installed telematics system.

Figure 3A:
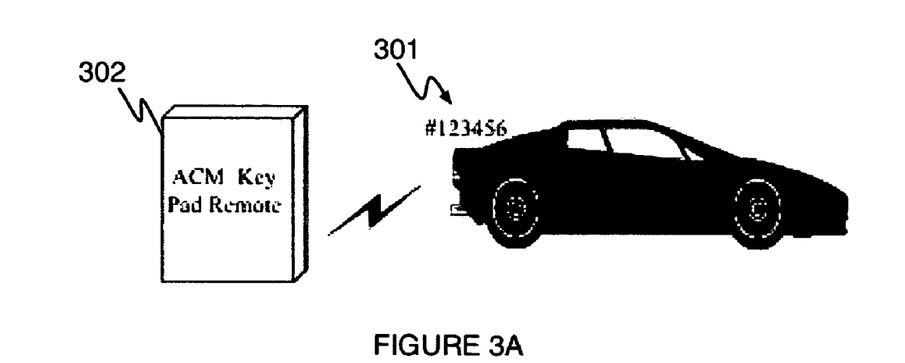
FIG. 3a is a diagram of a system according to an embodiment of the present invention.
Figure 3B:
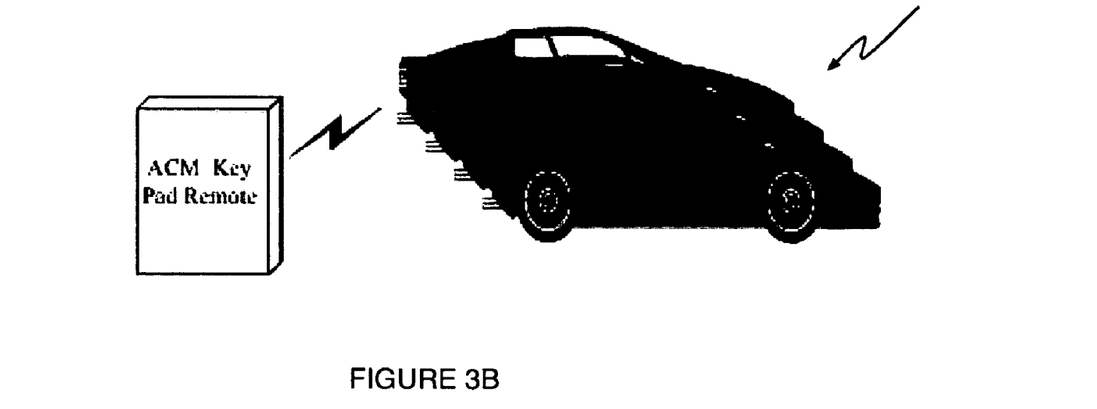
FIG. 3b is a diagram of a system according to an embodiment of the present invention.

Referring to FIG. 3A, a tag identification 301 is input to a control device 302, selecting a particular security system known to the control device 302 by a SIC. The control device determines the SIC as a proprietary combination or mixture of the tag identification 301 and a base identification. The selected security system responds when a command is sent from a control device 302. The commands comprises the SIC of the selected security system and a function to be performed by the selected security system. Each vehicle security system is programmed with a unique SIC. Therefore, access can be gained to a single vehicle on the dealer lot via a control device without accessing any other vehicle on the dealer lot. This is accomplished by utilizing a 0-9 keypad on the control device to enter a vehicle stock tag number or similar index corresponding to a stored SIC. Further, groups of vehicles 303 can share a group SIC, as shown in FIG. 3b. Thus, control commands can be sent to more than one vehicle simultaneously. An example of a control device is shown in FIG. 4.

The programming of the security system SIC can be by, for example, code learning techniques, wherein a security system learns the SIC from a first control device to operate after the security system is installed or activated for the first time.

Figure 4:
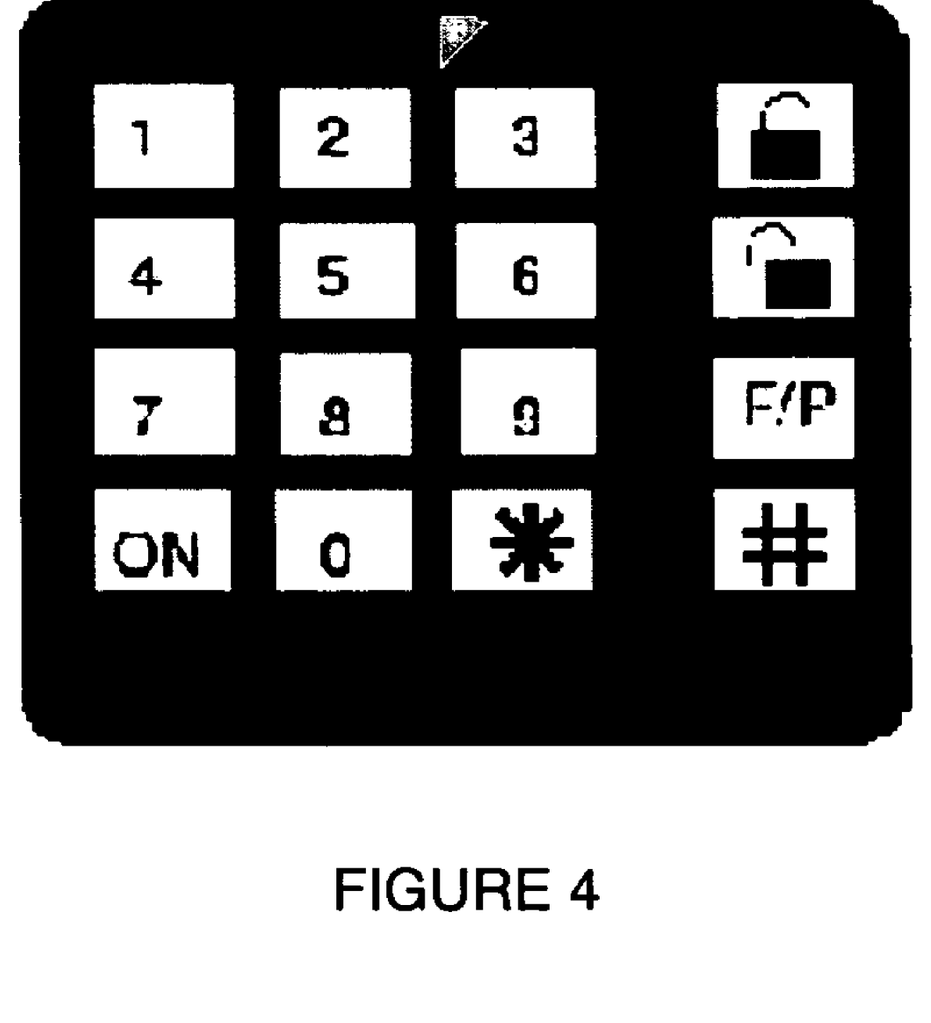
FIG. 4 is a diagram of a control device according to an embodiment of the present invention.

Referring to FIG. 4, the control device is a full range remote control transmitter comprising an alpha/numeric keypad. The control device is activated for operation by entering a password. The control device can then access any vehicle having an appropriate security system by entering a vehicle tag identification and pressing the "unlock" button. The tag identification can be, for example, letters, numbers, symbols, or combinations thereof.

Pressing an ON button, followed by entering the password activates the control device. Entering the vehicle's tag identification, followed by pressing the "UNLOCK" button deactivates the security system and unlocks the doors. Pressing and holding the UNLOCK button will pop the trunk or hatch if the vehicle is equipped with electric trunk or hatch release. One of ordinary skill in the art would appreciate that different procedures can be implemented to perform functions using the control device.

The security system can be rearmed via the control device or allowed to automatically rearm at a later time after the system was disarmed. In a dealer lot protection mode of operation the systems various security functions are programmable and can be tailored to a specific dealer's needs.

Entering a vehicle's tag identification followed by selecting "Find" activates a progressive find function to assist in locating a specific vehicle.

A user enters the vehicle tag identification and selects a control command. The vehicle tag identification is mixed with a base identification of the database, which is stored in the control device during authentication to create the SIC. The base identification number corresponds to the database from which control devices are authenticated and is the same for all control devices used by the dealer personnel. The base identification is maintained in the ACM and is transmitted to the control device when the ACM grants the control device permission to operate. Alternatively, SICs and tag identifications can be stored in a lookup table in the control device.

According to an embodiment of the present invention, a system comprises individual control devices. The individual control devices comprise a base identification as programmed before shipment to the dealership. The control devices are preprogrammed with an operational parameter, e.g., always enabled, and the ACM is not implemented. Accordingly, to access a particular vehicle, a vehicle tag identification is entered into the control device having the stored base identification.

Figure 5:
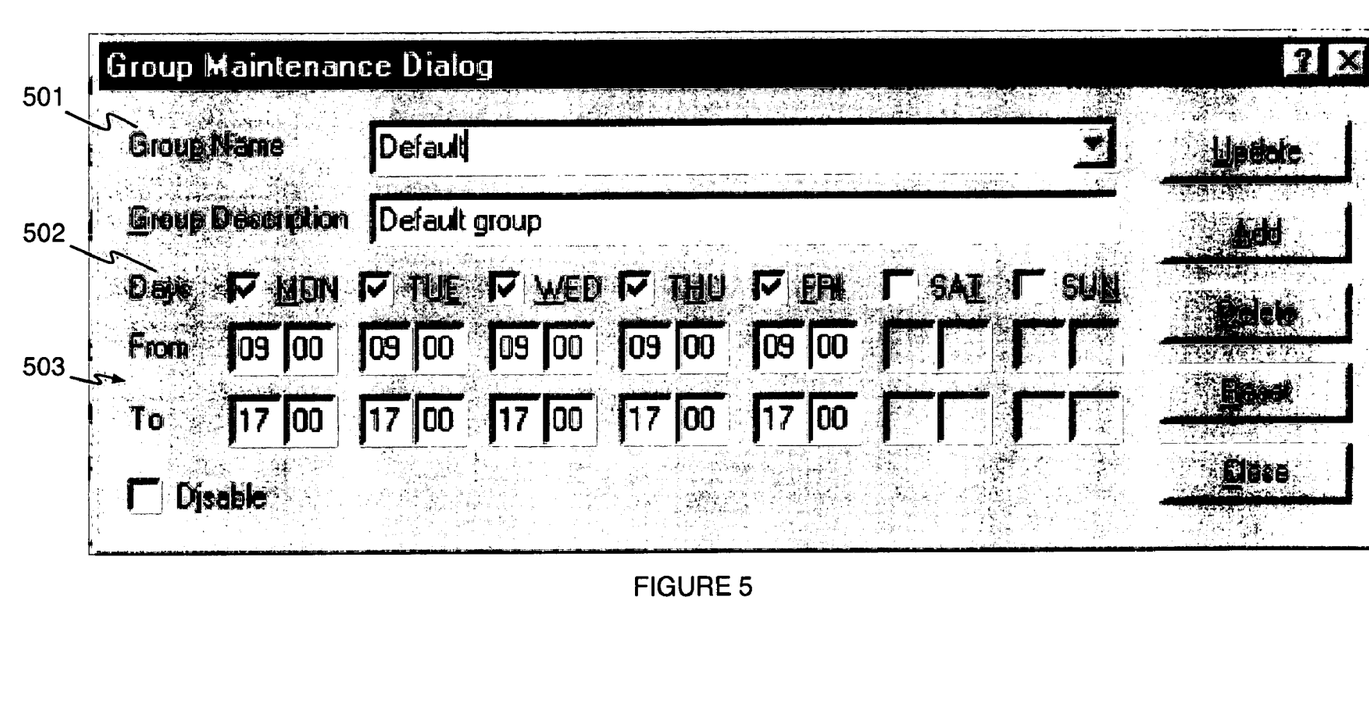
FIG. 5 is an illustration of an interface for programming a set of control devices according to an embodiment of the present invention.
Figure 6:
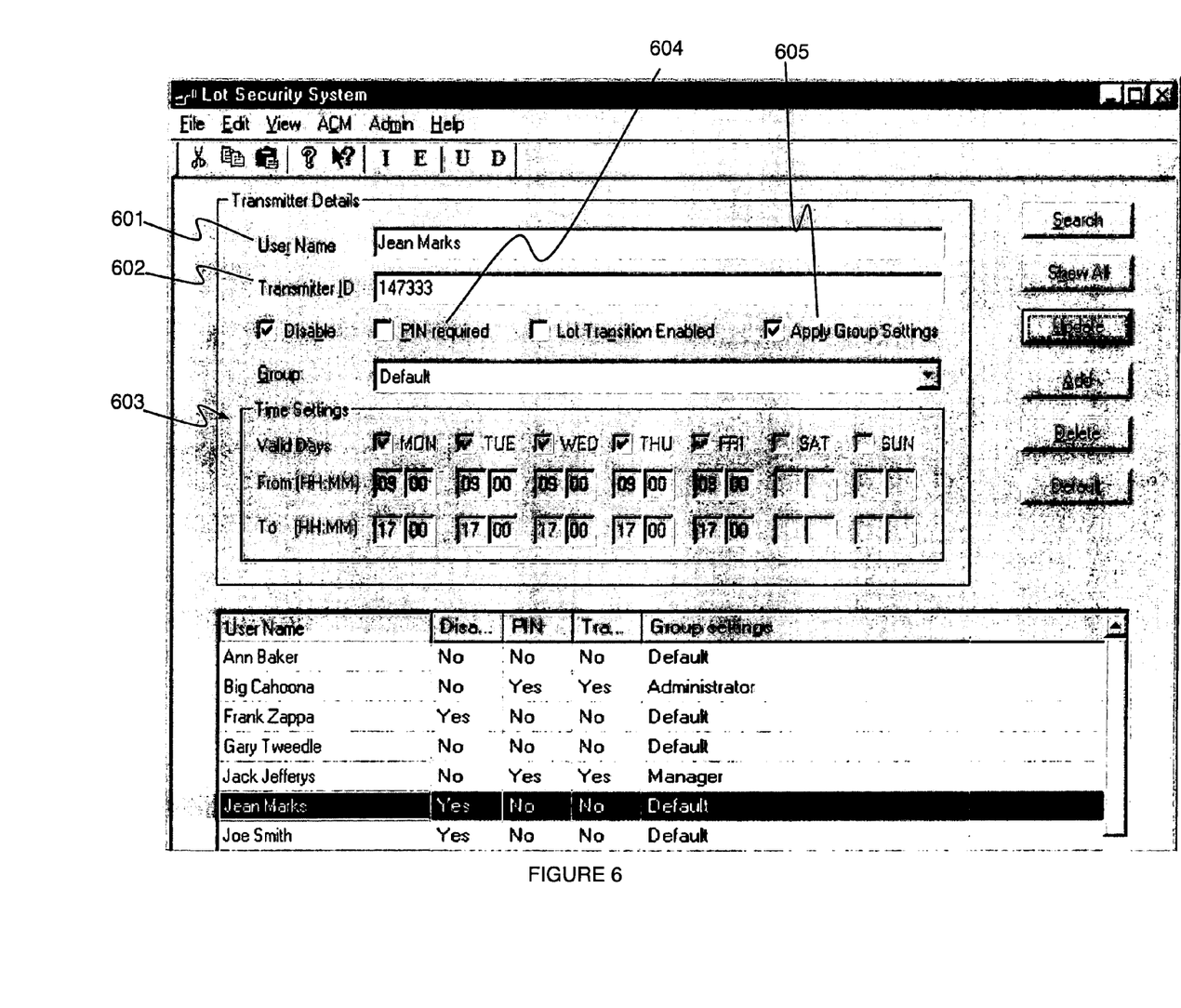
FIG. 6 is an illustration of an interface for modifying a user profile according to an embodiment of the present invention.

According to an embodiment of the present invention, the ACM is accessed through a software interface. FIGS. 5 and 6 show examples of individual windows of the software interface. Through the interface, a user can schedule operating hours of control devices, for example, as illustrated in FIG. 5. One or more control devices are defined as a group 501, and the group can be granted permission to operate for given days 502 and hours 503. Groups can be added or deleted from the system.

Referring to FIG. 6, a user 601, e.g., dealership salesperson, can be entered into the database as having been issued a control device 602. The control device has a defined controller identification. The control device 602 can be assigned individual permissions 603 or have permissions defined as part of a group 604. Further, the control device can be programmed to require the user to enter a personal identification number (PIN) 605 before commands can be issued by the control device to vehicle security systems. Device parameters, e.g., permissions, can be uploaded to the ACM device for granting and denying control device requests.

According to an embodiment of the present invention, control devices are given permissions for given time periods. For example, a control device may be give permission to operate on a daily basis by the ACM. Thus, the control device can operate vehicle security systems outside of a communications range of the ACM. According to an embodiment of the present invention, a control device is given permission on a per use basis, e.g., each time the control device is used. To determine permission on a per use basis, the control device is within a communications range of the ACM for each use. Accordingly, a control device that is lost or stolen will cease to have permission to operate after a given time, for example, after one day or immediately after the last use of the control device.

Permissions can define operational time periods of a control device and what operations are available to a control device. For example, a control device may be granted permission to disable a vehicle security system but not to activate a remote start feature of the vehicle.

According to an embodiment of the present invention, a master control device has permanent permissions enabling control over the vehicle security systems without ACM granted permissions. Thus, the master control device can operate even when the ACM device is offline. The master control device has a base identification that matches the base identification of the database and ACM.

The alarm system has the ability to operate in a dealer only mode used for lot protection, but also operate in a consumer mode. The dealer personnel can change the vehicle security operating mode through a control device without the need for an expert installer to access the vehicle.

Dealer mode and consumer mode relate to the type of remote that is able to control a vehicle security system. For example, in dealer mode, the dealer control device is used to operate the vehicle security system. The dealer control device is used to switch the vehicle security system from dealer mode to consumer mode. In consumer mode the vehicle security system can be programmed to be responsive to a consumer fob device, or may operate without a fob.

In addition to providing security features, according to an embodiment of the present invention a system comprising an ACM and control device are implemented for managing inventory. The control device reports usage information to the ACM. For example, the control device reports back to the ACM the vehicles and times that the control device was used to access. This information is stored in a database and is reported against. Where the control device is assigned to a particular user, such as a dealer salesperson, the dealer management can determine which vehicles are being shown to customers, by whom, and when, e.g., how often. The report can be used for inventory management, security management of the vehicles, and personnel management. As an inventory management tool a dealer may, for example, arrange vehicles in a lot such that the vehicles generating the most interest are positioned in a prominent area. As a security management tool, a dealer may, for example, position vehicles having higher rates of theft in a secure area, such as within a locked pen. As a personnel management tool, the dealer may, for example, monitor which employees tend to spend more time with vehicles by determining a time the security system was deactivated and a later time when the security system is activated.

Having described embodiments for selectively controlling one or more vehicle security systems, it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

1. A security system, comprising:
a control device that includes a keypad for inputting a request for permission to operate a plurality of vehicle security systems, wherein after the request has been input, a first message that includes the request and an identification of the control device is wirelessly transmitted from the control device; and
a control module that includes a database for storing operating parameters that are to be granted to control devices that have permission to operate the vehicle security systems, wherein upon receipt of the first message, the control module grants the control device permission to operate the vehicle security systems if the identification of the control device matches an identification of one of the control devices stored in the database, wherein if there is a match the control module wirelessly transmits a second message to the control device, the second message including operating parameters of the control device,
wherein upon receipt of the second message, the control device selectively controls the vehicle security systems in accordance with the operating parameters.

2. The security system of claim 1, wherein the operating parameters and permissions to operate are provided to the control module by a computer that is coupled to the control module via an interface of the control module.

3. The security system of claim 2, wherein the operating parameters are set and the permissions to operate are assigned by using a software application operating on the computer.

4. The security system of claim 1, wherein the control device selectively controls one of the vehicle security systems by wirelessly transmitting a third message to a vehicle security system, the third message including a unique identification of the vehicle security system and a command identifying a function to be performed by the vehicle security system.

5. A method for selectively controlling a vehicle security system, comprising:
transmitting, from a control device, a first message including a request for permission to operate a plurality of vehicle security systems and an identification of the control device;
receiving, at a control module the first message;
granting or denying, at the control module, the control device permission to operate the vehicle security systems based on information stored within a database accessible by the control module;
transmitting, from the control module, a second message to the control device when permission to operate the vehicle security systems is granted, the second message including operational parameters of the control device and a base identification of the database; and
selectively controlling one of the vehicle security systems, by transmitting, from the control device, a third message to a vehicle security system, the third message including a unique identification of the vehicle security system and a command identifying a function to be performed by the vehicle security system.

6. The method of claim 5, further comprising:
receiving the third message at the vehicle security system; and
comparing, at the vehicle security system, the unique identification in the third message to a unique identification stored in the vehicle security system.

7. The method of claim 6, further comprising performing the function upon determining that the unique identification in the third message is the same as the unique identification stored in the vehicle security system.

8. The method of claim 7, wherein the function performed is one or more of a door lock, a door unlock, a vehicle find, a vehicle panic, a vehicle security system arm, a vehicle security system disarm, a light on or off, an engine start or stop, and a trunk open or close.

9. The method of claim 5, further comprising transmitting the third message to at least two vehicle security systems that share the same unique identification.

10. The method of claim 5, further comprising transmitting, from the control device, a fourth message to the vehicle security system, the fourth message including new functions to be programmed into the vehicle security system.

11. The method of claim 5, further comprising changing an operating mode of at least one of the vehicle security systems by using a master control device without permission being granted by the control module.

12. The method of claim 5, wherein the base identification of the database is permanently defined in the control device.

13. The method of claim 5, wherein the operating parameters include functions that the control device has permission to instruct the vehicle security system to perform.

14. The method of claim 13, wherein the base identification of the database in the control device expires after a pre-determined time interval included in the operating parameters.

15. The method of claim 14, wherein the time interval is set by using the control module.

16. The method of claim 13, wherein the functions that the control device has permission to instruct the vehicle security system to perform are set by using the control module.

17. The method of claim 5, wherein the operating parameters include operating modes of the vehicle security system, wherein the operating modes are set by using the control module.

18. The method of claim 5, wherein communication between the control module and the control device is wireless and two-way.

19. The method of claim 5, wherein communication between the control module and the control device is via a docking station.

20. The method of claim 5, wherein the vehicle security system has a dealer mode and a consumer mode.

21. The method of claim 20, wherein the dealer mode provides a passive arming function and a test drive function.

22. The method of claim 5, wherein the unique identification is created by:
receiving a tag identification of the vehicle security system to be controlled at the control device; and
mixing the tag identification with the base identification.

23. The method of claim 20, wherein the consumer mode provides at least one of a remote security function, a keyless entry function, a security upgrade to keyless entry function, a remote car start function, and a remote car start upgrade to keyless entry function.

24. A security system, comprising:
a control device that includes a means for entering a request for permission to operate a plurality of vehicle security systems, wherein after the request has been entered, a first message that includes the request and an identification of the control device is wirelessly transmitted from the control device; and
a control module that includes a database for storing operating parameters that are to be granted to control devices that have permission to operate the vehicle security systems, wherein upon receipt of the first message, the control module grants the control device permission to operate the vehicle security systems if the identification of the control device matches an identification of one of the control devices stored in the database, wherein if there is a match the control module wirelessly transmits a second message to the control device, the second message including operating parameters of the control device,
wherein upon receipt of the second message, the control device selectively controls the vehicle security systems in accordance with the operating parameters.

25. The security system of claim 24, wherein the operating parameters and permissions to operate are provided to the control module by a computer that is coupled to the control module via an interface of the control module.

26. The security system of claim 25, wherein the operating parameters are set and the permissions to operate are assigned by using a software application operating on the computer.

27. The security system of claim 24, wherein the control device selectively controls one of the vehicle security systems by wirelessly transmitting a third message to a vehicle security system, the third message including a security identification of the vehicle security system and a function to be performed by the vehicle security system.

28. A security system, comprising:
a computer that includes a database for storing operating parameters that are to be granted to control devices that have permission to operate a plurality of vehicle security systems, wherein the operating parameters include time intervals during which the control devices have permission to operate the vehicle security systems, wherein the time intervals are set to a first clock in the computer;
a control module that includes a second clock synchronized with the first clock, the control module for granting or denying the control devices permission to operate the vehicle security systems based on the permissions stored in the database; and
a control device that includes a keypad for inputting a request for permission to operate the vehicle security systems and a timer for measuring time intervals, the control device transmitting a first message to the control module, the first message including the request and an identification of the control device, wherein if permission to operate the vehicle security systems is granted by the control module, the control device receives a second message that includes operating parameters assigned to the control device, the operating parameters including a first time interval during which the control device can operate the vehicle security systems,
wherein after receiving the second message, the control device operates one of the vehicle security systems during the first time interval by transmitting a third message to a vehicle security system, the third message including a unique identification of the vehicle security system and a command identifying a function to be performed by the vehicle security system,
wherein at an end of the first time interval measured by the timer, the permission to operate the vehicle security system is expired.

* * * * *